US008499042B2

(12) United States Patent
Brown, Jr. et al.

(10) Patent No.: US 8,499,042 B2
(45) Date of Patent: Jul. 30, 2013

(54) SYSTEM FOR MANAGING E-MAIL TRAFFIC

(75) Inventors: Bruce L. Brown, Jr., Goleta, CA (US);
Samuel G. Silberman, Arlington, MA (US); Mark H. Granoff, Framingham, MA (US); Rajesh P. Chaube, Tokyo (JP); Robert M. Fleischman, Concord, NH (US); Michael S. Zraly, Somerville, MA (US)

(73) Assignee: Unwired Planet, Inc., Redwood City, CA (US)

( * ) Notice: Subject to any disclaimer, the term of this patent is extended or adjusted under 35 U.S.C. 154(b) by 1347 days.

(21) Appl. No.: 10/864,141

(22) Filed: Jun. 8, 2004

(65) Prior Publication Data

US 2005/0188028 A1 Aug. 25, 2005

Related U.S. Application Data

(60) Provisional application No. 60/540,783, filed on Jan. 30, 2004, provisional application No. 60/540,752, filed on Jan. 30, 2004.

(51) Int. Cl.
*G06F 15/16* (2006.01)

(52) U.S. Cl.
USPC .......................................... 709/206; 709/203

(58) Field of Classification Search
USPC ................. 709/206, 203, 229; 726/13, 28–30
See application file for complete search history.

(56) References Cited

U.S. PATENT DOCUMENTS

| | | | | |
|---|---|---|---|---|
| 5,983,270 A | * | 11/1999 | Abraham et al. | 709/224 |
| 6,138,146 A | * | 10/2000 | Moon et al. | 709/206 |
| 6,147,977 A | * | 11/2000 | Thro et al. | 370/265 |
| 6,321,267 B1 | * | 11/2001 | Donaldson | 709/229 |
| 6,381,250 B1 | * | 4/2002 | Jacobson et al. | 370/468 |
| 6,393,464 B1 | | 5/2002 | Dieterman | |
| 6,484,261 B1 | * | 11/2002 | Wiegel | 726/11 |
| 6,574,193 B1 | * | 6/2003 | Kinrot | 370/229 |
| 6,816,903 B1 | * | 11/2004 | Rakoshitz et al. | 709/226 |
| 6,961,341 B1 | * | 11/2005 | Krishnan | 370/412 |
| 7,146,402 B2 | * | 12/2006 | Kucherawy | 709/206 |
| 7,203,749 B2 | * | 4/2007 | Hiraga | 709/224 |
| 7,320,032 B2 | * | 1/2008 | Johnson | 709/225 |
| 7,328,250 B2 | * | 2/2008 | Wang | 709/207 |
| 7,404,205 B2 | * | 7/2008 | Scoredos et al. | 726/13 |
| 7,415,504 B2 | * | 8/2008 | Schiavone et al. | 709/207 |
| 7,490,128 B1 | * | 2/2009 | White et al. | 709/206 |

(Continued)

OTHER PUBLICATIONS

Paul Hoffman, Dave Crocker; "Unsolicited Bulk Email: Mechanisms for Control"; Internet Mail Consortium Report: UBE-SOL IMCR-008; May 4, 1998.

*Primary Examiner* — Asghar Bilgrami

(57) ABSTRACT

According to a first embodiment of the invention, if an e-mail sender attempts to make too many connections within a predetermined period of time, the excess connections are automatically rejected. According to a second embodiment of the invention, an agreement is established between an e-mail sender and an e-mail recipient that states when the sender may send e-mail messages to the recipient. According to a third embodiment of the invention, trend data reflecting an amount of e-mail sent by a sender is collected. The trend data can be used to establish a rate limit for the sender. According to a fourth embodiment of the invention, separate rate limits are established for authenticated and unauthenticated mail from addresses. According to a fifth embodiment of the invention, a sender may have a rate at which their e-mail is transmitted reduced if they exceed predetermined rate limits.

17 Claims, 17 Drawing Sheets

U.S. PATENT DOCUMENTS

| | | | |
|---|---|---|---|
| 7,647,411 B1* | 1/2010 | Schiavone et al. | 709/229 |
| 7,660,794 B2* | 2/2010 | Scoredos | 707/783 |
| 7,711,779 B2* | 5/2010 | Goodman et al. | 709/206 |
| 7,831,676 B1* | 11/2010 | Nagar | 709/206 |
| 7,849,142 B2* | 12/2010 | Clegg et al. | 709/206 |
| 7,856,497 B2* | 12/2010 | McKinnon et al. | 709/224 |
| 2003/0018775 A1* | 1/2003 | Shiba et al. | 709/223 |
| 2003/0050988 A1* | 3/2003 | Kucherawy | 709/207 |
| 2003/0236847 A1* | 12/2003 | Benowitz et al. | 709/206 |
| 2004/0003030 A1* | 1/2004 | Abe | 709/203 |
| 2004/0015579 A1* | 1/2004 | Cooper et al. | 709/223 |
| 2004/0199592 A1* | 10/2004 | Gould et al. | 709/206 |
| 2004/0250127 A1* | 12/2004 | Scoredos et al. | 713/201 |
| 2005/0080855 A1* | 4/2005 | Murray | 709/206 |
| 2005/0080872 A1* | 4/2005 | Davis et al. | 709/217 |
| 2005/0091320 A1* | 4/2005 | Kirsch et al. | 709/206 |
| 2005/0160148 A1* | 7/2005 | Yu | 709/206 |
| 2006/0015942 A1* | 1/2006 | Judge et al. | 726/24 |

\* cited by examiner

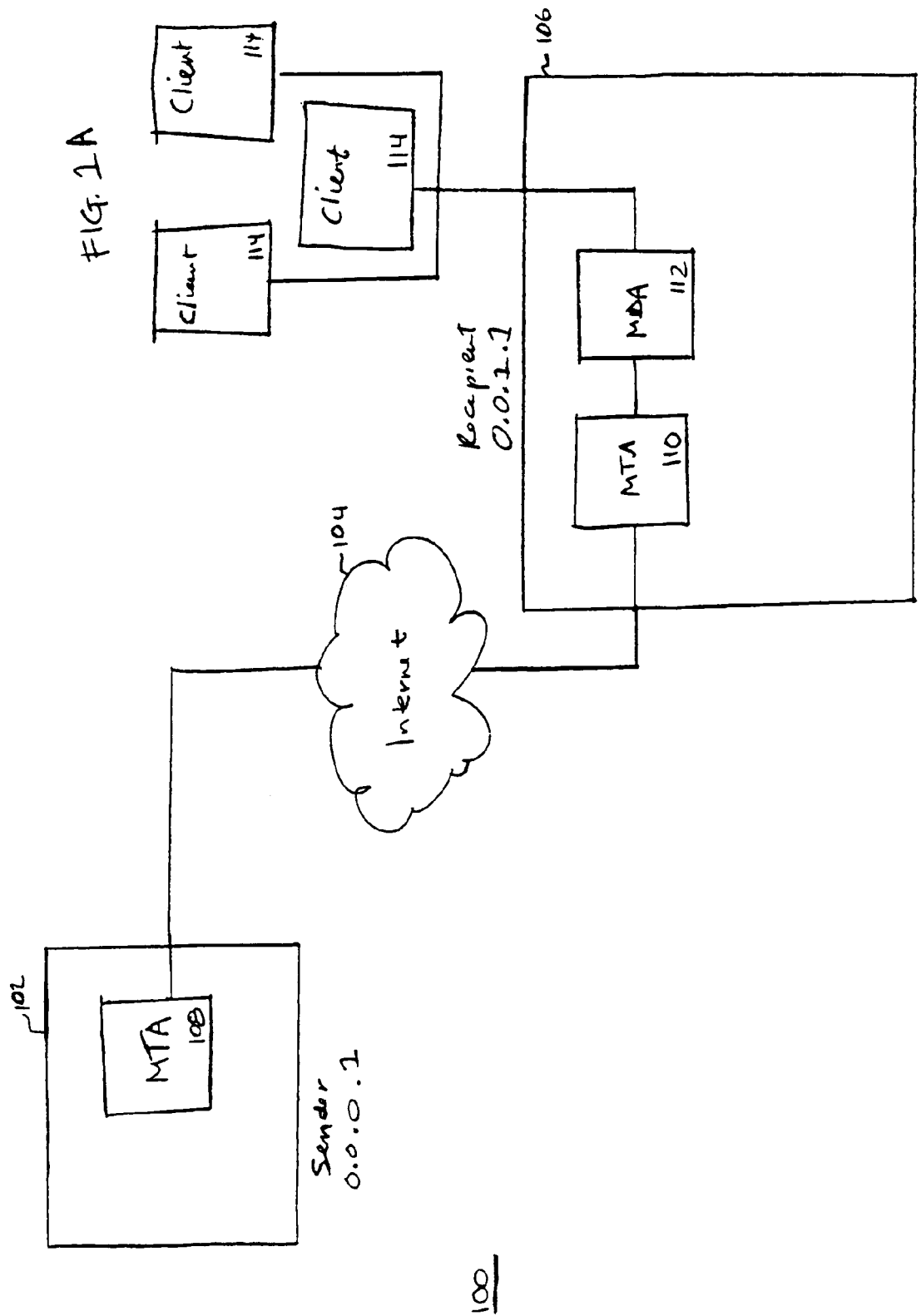

FIG. 3A

| Threshold | Time Monitored |
|---|---|
| 3 | 10 min. |

| IP Address | Current No. of Connections | Action |
|---|---|---|
| 0.0.0.1 | 5 | Do nothing |
| 0.0.0.3 | 4 | Do nothing |
| 0.0.0.8 | 4 | Do nothing |
| 0.0.0.12-0.0.0.14 | 5 | Do nothing |

| IP Address | Current No. of Connections | Action |
|---|---|---|
| 0.0.0.1 | 5 | Reject > 3 |
| 0.0.0.3 | 4 | Accept |
| 0.0.0.8 | 4 | Reject > 1 |
| 0.0.0.12-0.0.0.14 | 5 | Reject |

| IP Address ~352 | Action ~354 |
|---|---|
| 0.0.0.1 | Reject > 3 |
| 0.0.0.2 | Do nothing |
| 0.0.0.3 | Accept |
| 0.0.0.4 | Do nothing |
| 0.0.0.5 | Do nothing |
| 0.0.0.6 | Do nothing |
| 0.0.0.7 | Do nothing |
| 0.0.0.8 | Reject > 1 |
| 0.0.0.9 | Do nothing |
| 0.0.0.10 | Do nothing |
| 0.0.0.11 | Do nothing |
| 0.0.0.12 | Reject |
| 0.0.0.13 | Reject |
| 0.0.0.14 | Reject |

350

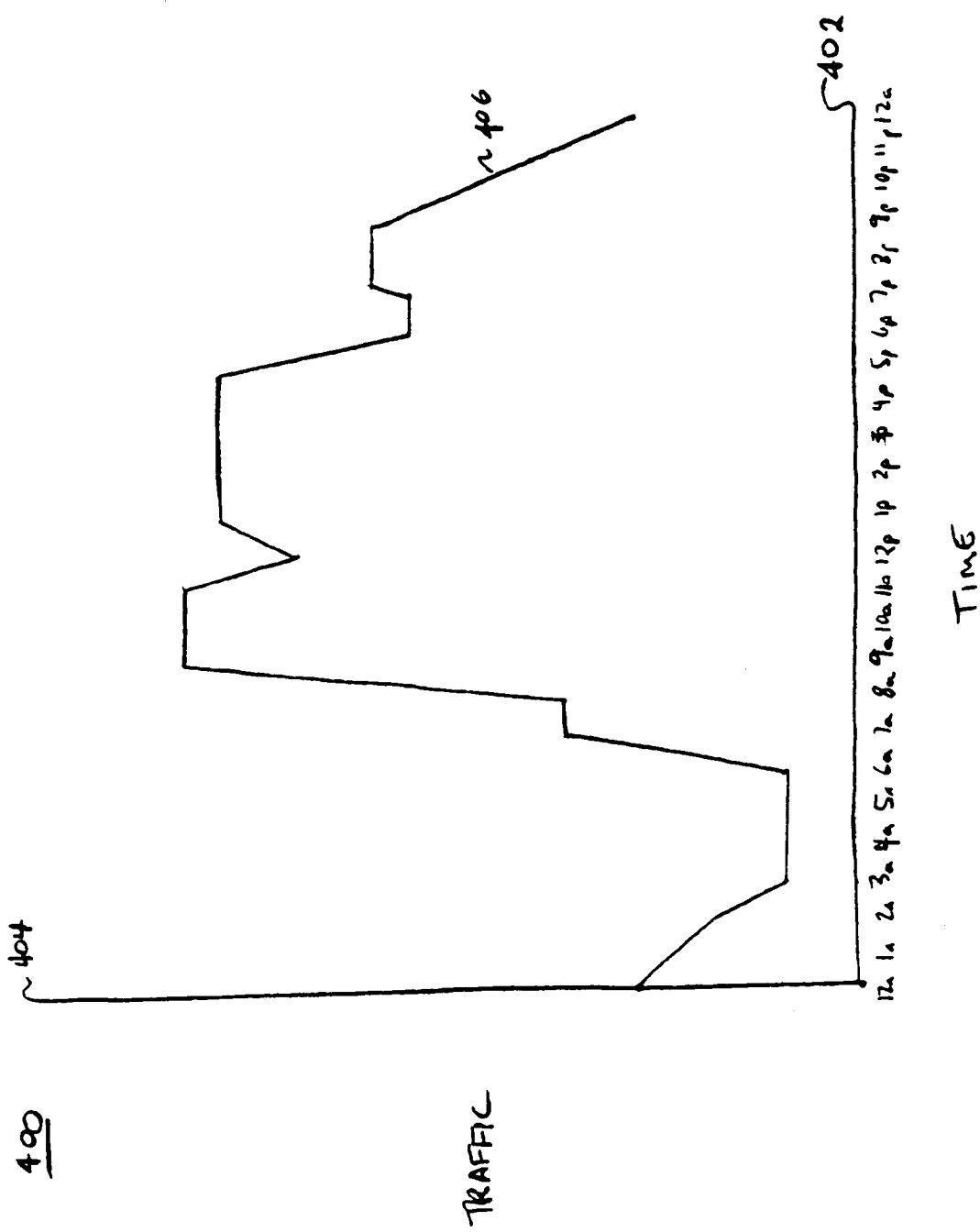

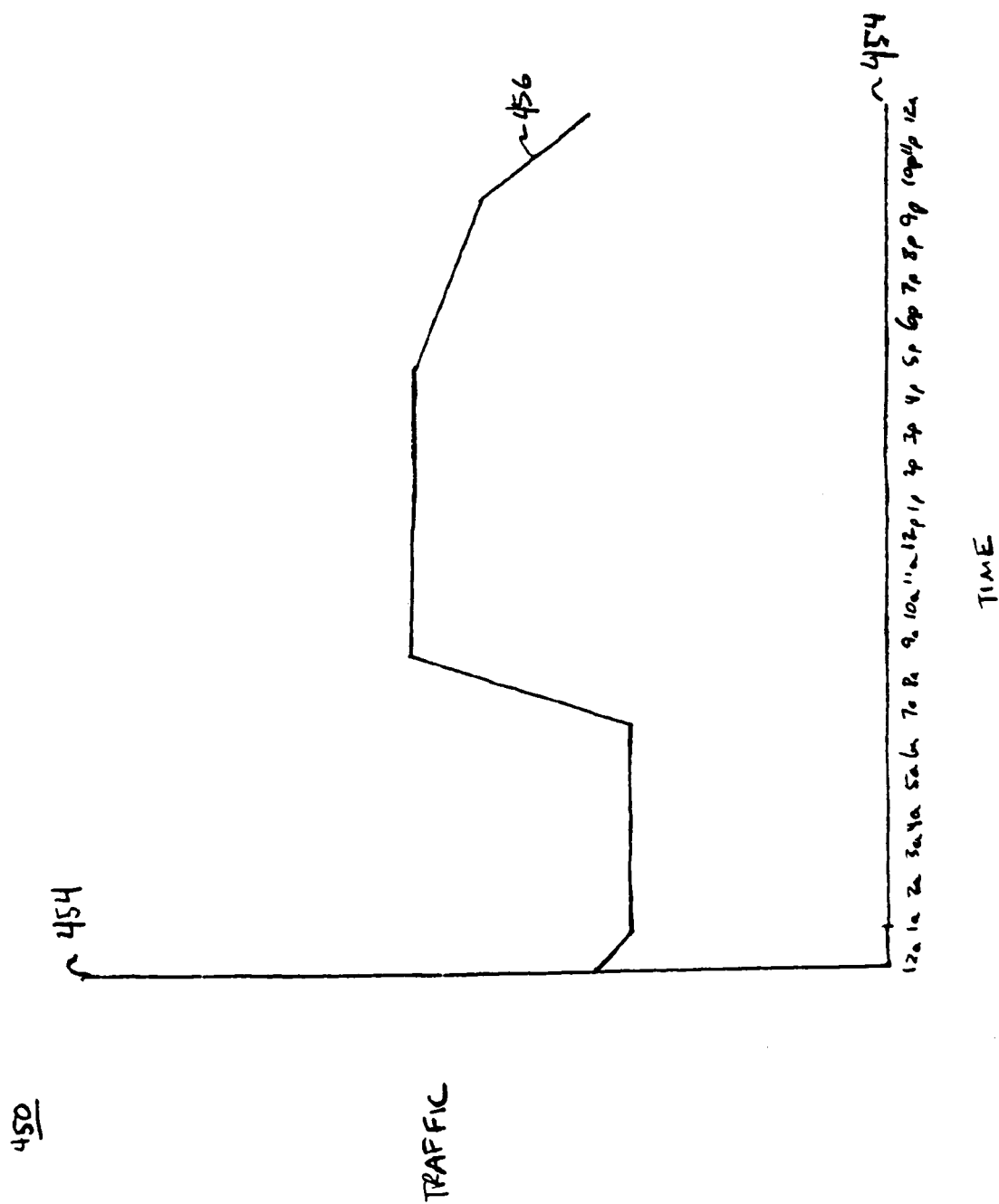

500

| Allowed List ~502 | Denied List ~504 | Conditional Allowed List ~506 |
|---|---|---|
| 0.0.0.1 | 0.0.0.3 | 0.0.0.5 |
| 0.0.0.2 | 0.0.0.4 | 0.0.0.6 |
|  |  | 0.0.0.7 |
|  |  | 0.0.0.8 |
|  |  | 0.0.0.9 |
|  |  | 0.0.0.10 |
|  |  | 0.0.0.11 |
|  |  | 0.0.0.12 |
|  |  | 0.0.0.13 |
|  |  | 0.0.0.14 |
|  |  | 0.0.0.15 |

FIG. 5

| IP Adress | Days | Times | RateLimit |
|---|---|---|---|
| 0.0.0.5 | Mon<br>Tue<br>Wed<br>Thu<br>Fri<br>Sat<br>Sun | 1a - 2a<br>1a - 2a<br>1a - 2a<br>1a - 2a<br>1a - 2a | 5 msg/s<br>5 msg/s<br>5 msg/s<br>5 msg/s<br>5 msg/s |
| 0.0.0.6 | Thu | 3a - 4a | |
| 0.0.0.7 | Sat<br>Sun | | 5 msg/s<br>5 msg/s |
| 0.0.0.8 | | | 5 msg/s |

FIG. 6

| IP Address | Days | Time |
|---|---|---|
| 0.0.0.9 | Mon | 1-2a |
| 0.0.0.10 | Mon | 2-3a |
| 0.0.0.11 | Mon | 3-4a |
| 0.0.0.12 | Mon | 4-5a |
| 0.0.0.13 | Tue | 1-2a |
| 0.0.0.14 | Tue | 2-3a |
| 0.0.0.15 | Tue | 3-4a |

| | 0.0.0.1 | 0.0.0.2 |
|---|---|---|
| | | 904 |
| | 902 | |
| Monday | 1005 | 23 |
| Tuesday | 1254 | 28 |
| Wednesday | 1817 | 26 |
| Thursday | 2042 | 39 |
| Friday | 567 | 51 |
| Saturday | 18 | 54 |
| Sunday | 12 | 48 |

1200

SYSTEM FOR MANAGING E-MAIL TRAFFIC

This application claims the benefit of U.S. Provisional Patent Application No. 60/540,783, entitled "System For Reducing E-Mail Traffic Volume" filed Jan. 30, 2004 and U.S. Provisional Patent Application No. 60/540,752, entitled "System For Managing E-Mail Traffic" filed Jan. 30, 2004.

BACKGROUND OF THE INVENTION

"Bulk e-mail" refers to large numbers of e-mail messages sent by a single sender to a large number of recipients. Bulk e-mail may either be e-mails that are requested by the recipient, such as a message from an e-commerce website listing their weekly specials, or can be unsolicited bulk e-mail (UBE), more commonly known as "Spam." UBE and requested bulk e-mail can overwhelm a recipient e-mail system due to the resulting high volume of traffic. Additionally, UBE may include messages that contain computer viruses, scams, or other unwanted and undesirable content.

UBE can typically be removed before it reaches an individual recipient's inbox using content filters, more commonly known as Spam filters. Content filters scan the text of an incoming e-mail message to determine whether it includes offending content which may be indicative of UBE. However, scanning each incoming message for specific content is very resource intensive. While content filtering can reduce the amount of traffic behind the frontline, or the first servers to receive an incoming transmission, the frontline server must expend vast system resources to scan all incoming messages for offending content. Another disadvantage of content filtering is that it is possible that content filters may inadvertently reject messages that an e-mail recipient wishes to receive. Messages that are unintentionally removed with a content filter are known as "false positives", which are obviously undesirable since an e-mail recipient may not receive an important message based on its' content.

Other schemes for preventing the delivery of UBE exist. For example, realtime black lists (RBL) can cause an e-mail recipient server to perform a domain name system (DNS) lookup to a DNS server that contains a list of UBE senders. The recipient system can then compare an address of the sender with addresses on the RBL. RBLs still require an extra lookup step, which consumes the recipient's resources, and can reduce server responsiveness.

Bulk e-mail of any type can overwhelm a recipient system because of the large number of e-mails that are received at one time. For example, an airline sending out its list of monthly specials may send those e-mails all at once. If a recipient e-mail system has a number of subscribers to this monthly message, the system may become overwhelmed when the e-mails arrive. The receiving system may be overwhelmed not only because of the incoming bulk e-mails, but also because of otherwise normal activity. For example, the highest periods of activity on e-mail systems tends to occur during the day. If a bulk e-mailer were to send a number of messages to a corporate e-mail server at 3:00 p.m., during business hours, the e-mail system may be concurrently handling voluminous amounts of other e-mail traffic. The addition of the bulk e-mails at that time may overwhelm the system, requiring the e-mail server to be upgraded at considerable expense.

Another way to limit the amount of incoming traffic is to limit the rate of messages incoming from specific known bulk senders. For example, each bulk sender has an Internet Protocol (IP) address that identifies the server from which the e-mail is being sent. An e-mail recipient server can have a preset rate limit for each sender based on their IP address. The limit may be expressed in terms of the amount of data per second, the number of messages per second, etc. These rate-limiting techniques may also form part of a larger "abuse" rating. An abuse rating measures the amount of abuse inflicted upon the recipient server by a certain IP address. The abuse rating may also include several other factors, such as the type of message, the typical size of the messages, or the number of messages.

The abuse rating may effectively limit the amount of bulk e-mail received by a recipient e-mail server. However, for various reasons, the recipient e-mail server operator may want to receive certain messages being sent by certain senders. However, these messages might still overwhelm the system if they are sent during peak times. What is needed is a method for limiting bulk e-mails at certain times in order to even out the e-mail traffic on a specific e-mail server.

SUMMARY

According to a first embodiment of the invention, an e-mail server tracks connections from incoming senders, and establishes a monitor to determine whether a sender from a specific IP address has established a number of connections greater than a threshold value. If it is determined that the number of connections is greater than threshold value, the recipient can note the connection and decide what to do in the future with attempted connections from this sender. For example, in the future the recipient can choose to drop all connections made by the sender, accept all connections made by the sender, or accept only a certain number connections from the sender.

According to a second embodiment of an invention, a server that receives incoming e-mail may establish date and time limitations for incoming e-mail messages. These limitations can be established such that e-mail connections from senders at specific IP addresses are accepted or rejected based upon the date or time of the attempted connection.

According to a third embodiment of the invention, trend data may be used to establish rate limits. For example, a recipient e-mail server may track the number of messages sent by a specific sender over time. If the sender sends more messages than they typically send, the recipient may reject the messages or notify a system administrator of the abnormality.

According to a fourth embodiment of the invention, separate rate limits may be established for authenticated and unauthenticated e-mail messages. When an unauthenticated message is received, the message counts toward the unauthenticated limit. Likewise, when an authenticated message is received, the message counts toward the authenticated limit.

According to a fifth embodiment of the invention, a sender's e-mail system may track the amount of e-mail the sender is sending. If the amount exceeds a threshold, the e-mail system may reduce the rate at which the e-mails are sent for that sender.

Other aspects of the invention will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which:

FIG. 1A illustrates a typical e-mail system;

FIGS. 3A-3D illustrate exemplary control panels for a recipient system employing an embodiment of the current invention;

FIGS. 4A and 4B illustrate incoming network traffic to a typical recipient e-mail server;

FIG. 5 illustrates a list of potential senders to a recipient;

FIG. 6 illustrates a table establishing conditions for the e-mail connection for specific IP addresses;

FIG. 7 illustrates a table that includes a schedule listing when senders from specific IP addresses may transmit e-mail;

FIG. 9 illustrates a table containing historical trends for two senders;

DETAILED DESCRIPTION

Figure 1B:
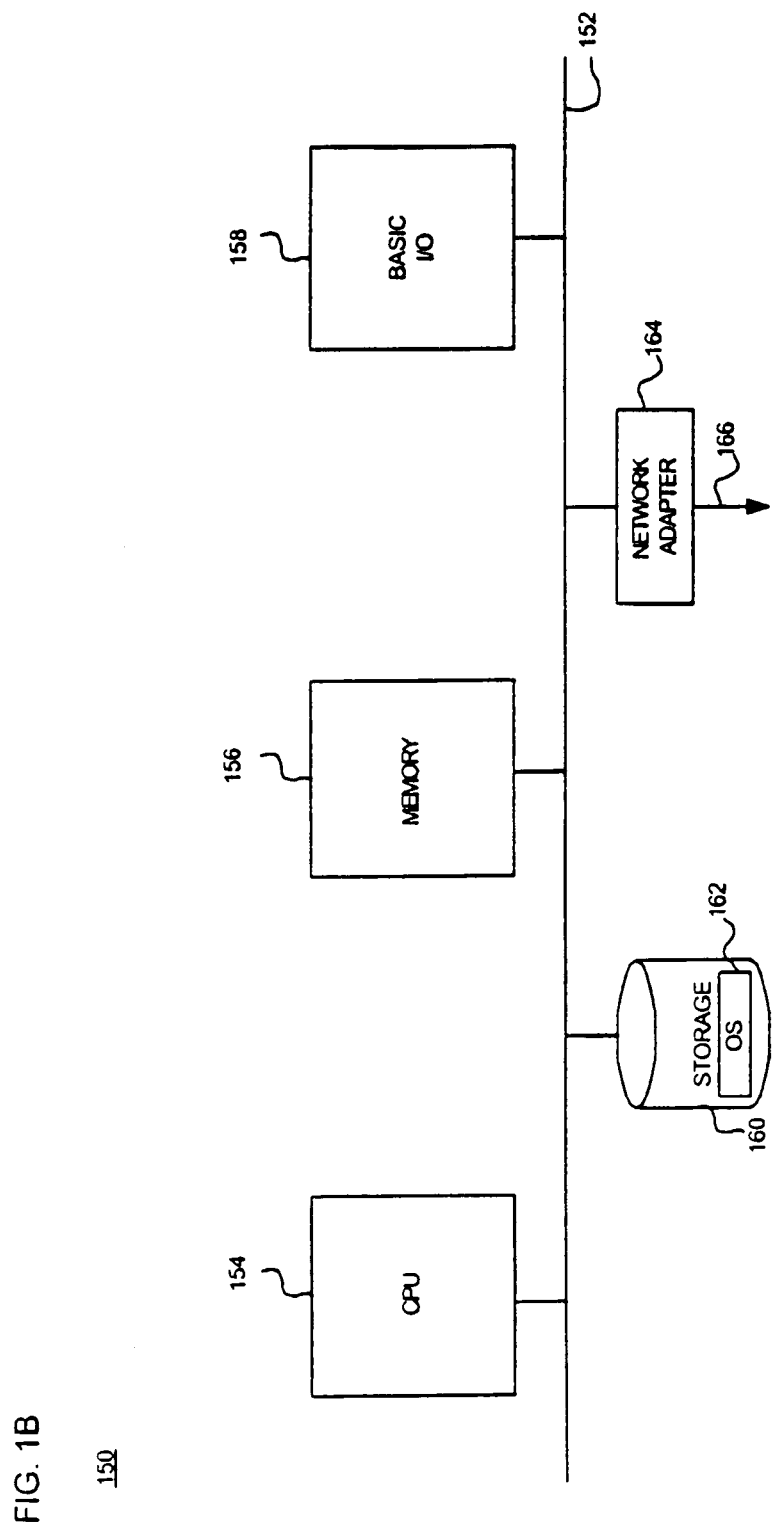
FIG. 1B illustrates a computer system on which embodiments of the present invention can be implemented.

Described herein is a system for reducing e-mail traffic volume. In the following description, numerous specific details are set forth. However, it is understood that embodiments may be practiced without these specific details. For example, well known equivalent processes may be substituted in place of those described herein, and similarly, well known equivalent components may be substituted in place of those disclosed herein. In other instances, well known structures and techniques have not been shown in detail in order not to obscure the understanding of this description.

Several embodiments of the invention are described. According to aspects of these several embodiments, rate limits for incoming and outgoing e-mails can be established. These rate limits can limit the number of messages sent or received over a period of time. For example, a recipient e-mail system may establish that a specific sender can only sender five messages every minute. If the sender sends more than five messages per minute, the extra messages may be rejected. The rate limits may also apply to the size of the messages, etc. The rate limiting can be used to reject unwanted bulk e-mail or to manage bulk e-mail in a predictable manner.

As used in this description, a "sender" is a network server or group of servers that sends e-mail messages. A sender may be found at internet protocol (IP) address or other identifying address. As it is used here, the sender is the server that distributes e-mail messages created by others, including bulk e-mails such as newsletters or UBE, and groups and individuals sending smaller quantities of e-mail. A "recipient" is a network server or group of servers that receives the messages sent by the sender. Once the recipient server has received these messages, the recipient server can then distribute them to the intended end users. An "e-mail server" is a computer system connected to a network, such as the Internet, that is capable of receiving and transmitting e-mail messages.

FIG. 1 illustrates a typical e-mail system. The system 100 may be used to implement the several embodiments of the invention. The sender 102 sends e-mail messages over the Internet 104 to a recipient 106. The frontline of the sender 102 is a mail transfer agent (MTA) 108, which may use the Simple Mail Transfer Protocol (SMTP) or other well-known protocols. The sender's MTA 108 is responsible for delivering messages across the internet 104. The recipient 106 also has an MTA 110. The MTA 110 is the recipient 106's frontline server and receives incoming messages. The MTA 110 may also use the SMTP protocol. The MTA 110 is coupled with a mail delivery agent (MDA) 112. The MDA 112 distributes messages to the clients 114, who may be the end users or other servers that may distribute mail to smaller groups of end users. An extension server 116 may be coupled to the MTA 110. The extension server 116 may be a separate server that performs operations for the MTA 110. For example, the MTA 110 may request a certain operation from the extension server 116, supply the extension server 116 with the data necessary to complete that specific operation, and the extension server 116 will return the results of that operation to the MTA 110 when it is completed.

The MTAs 108 and 110 are software programs that transfer mail and may implement a protocol such as the Simple Mail Transfer Protocol (SMTP). The MTA 110 is the first program to receive an incoming e-mail transmission. The MTA 110 may accept or reject a connection by a sender 102. For example, the sender 102 has an Internet protocol (IP) address of 0.0.0.1. The recipient 106 has an IP address of 0.0.1.1. If the sender 102 wants to transmit a message to the recipient 106, the MTA on the sender 102 specifies the IP address of 0.0.1.1, signifying the recipient 106. When the recipient 106 receives this transmission from the sender 102, the transmission includes the sender's IP address. The MTA 110 may examine the sender's 106 IP address and decide whether to accept or reject the transmission. This will be explained further below.

FIG. 1B illustrates a computer system on which embodiments of the present invention can be implemented. The sender 102 and the recipient 106 may use one or more servers such as the computer system 150 to implement aspects of the invention. The computer system 150 includes a bus 152, which serves as a distribution channel for information throughout the computer system 150. A processor 154 is coupled to the bus 152. The processor 154 may be any suitable processor, including but not limited to those manufactured by Intel and Motorola. The processor 154 may also comprise multiple processors. A memory 156 is also coupled to the bus 152. The memory 156 may include random access memory (RAM), read only memory (ROM), flash memory, etc. A basic Input/Output unit 158 receives input from several sources such as keyboards, mice, etc., and outputs to output devices such as displays, speakers, etc. Storage 160 may include any type of permanent or transient storage including magnetic or optical storage such as hard drives or compact disc-read only memories (CD-ROM). A copy of an operating system (OS) 162 may be stored on the storage 160. The OS 162 includes the software necessary to operate the computer system 150, and may be a Unix based OS or any other appropriate OS. A network adapter 164 connects the computer system 150 with other systems in a cluster, and with other networks such as the Internet through a connection 166. It is understood that the computer system 150 is only an example of computer systems that may be used to implement the invention, and that any other appropriate configuration may be used.

FIGS. 2 and 3A-3D describe a first embodiment of the invention. According to the first embodiment of the invention, an e-mail recipient server tracks the number of incoming connections made by an e-mail sender over a certain period of time. If this number of incoming connections is greater than a predetermined threshold value, the recipient server may react in a number of ways. First, the recipient server may do nothing, place the IP address on a monitoring list, and decide what to do later. The recipient server may decide to always accept connections from a specific IP address. The recipient server may decide always reject connections from a specific IP address. Or, the recipient may decide to accept only a certain number of connections from a specific IP address. Since the senders of unsolicited bulk e-mail (UBE) typically send large numbers of messages to recipient systems, and therefore typically require several connections to deliver those messages, a recipient can track all senders who initiate a large number of connections and determine later whether that sender is trustworthy. By doing so, the recipient can limit the total traffic on their network and limit the amount of unwanted e-mail without resorting to content filtering or other resource intensive or unreliable processes.

Figure 2:
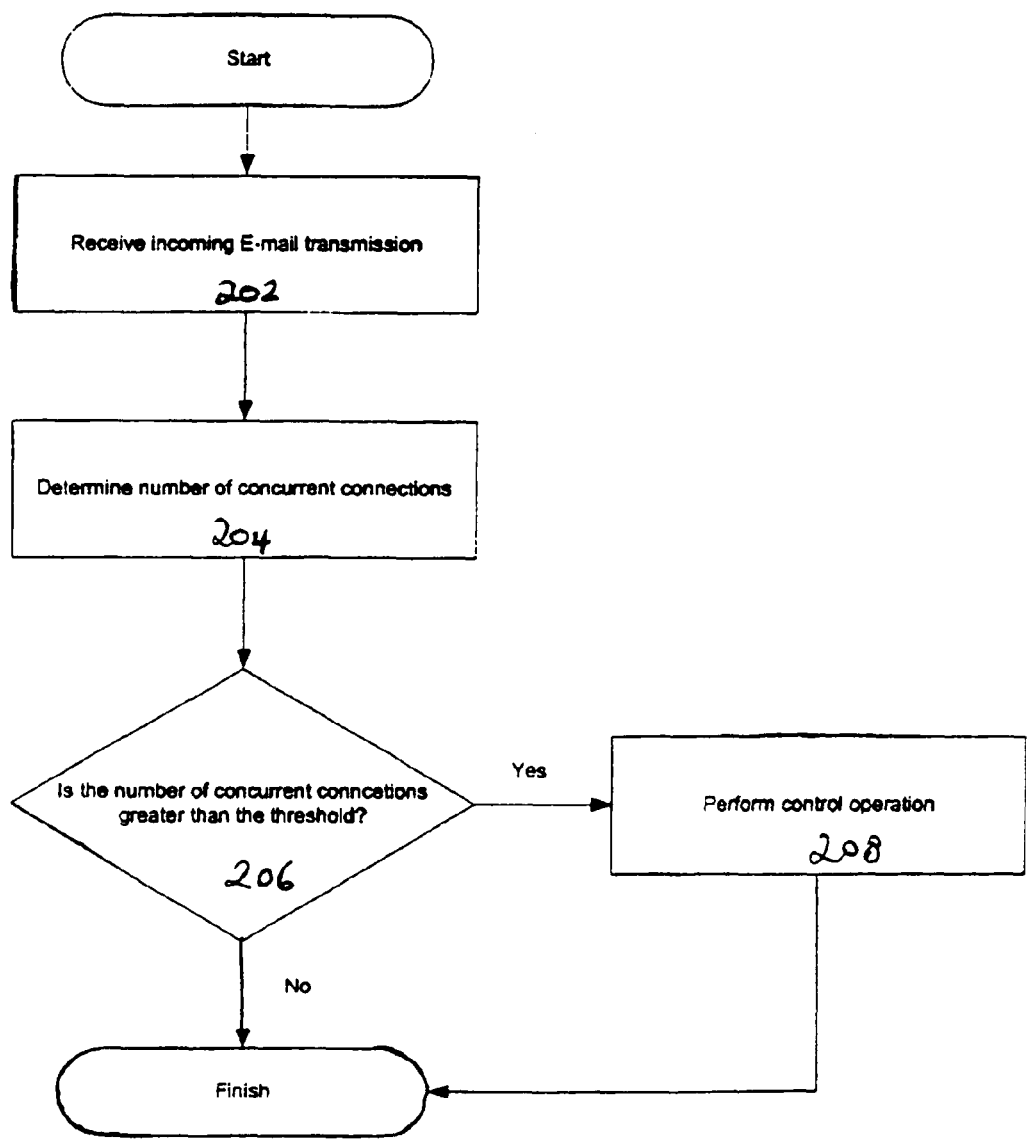
FIG. 2 is a flow chart illustrating a method according to an embodiment of the invention.

FIG. 2 is a flow chart illustrating a method according to an embodiment of the invention. In block 202, a recipient receives an incoming e-mail transmission. The recipient may determine the sender's IP address from this incoming transmission. In block 204, the number of concurrent connections from the same sender is determined. The recipient can compare the IP address of the sender attempting to connect with the IP addresses of other concurrent connections or connections that were made within a certain amount of time prior to the initiation of the current connection. For example, according to one embodiment of the invention, the total number of concurrent connections is determined based on the number of connections initiated by the same sender within the last ten minutes. As a further example, a sender is attempting to connect at 10:00 a.m., and had previously made connections at 9:54 a.m., 9:52 a.m., 9:48 a.m., and 9:45 a.m. None of these previous connections are still active. If the number of concurrent connections is determined within the last ten minutes, the new connection would be the third concurrent connection, since the connections made at 9:48 and 9:45 were made more than ten minutes ago.

Even though a sender is described herein as an e-mail sender from a single IP address, it is also contemplated that a single sender may send e-mail from a range of IP addresses. For example, a recipient may determine that several connections have been made from the same sender, even though the IP address of those several connections is not exactly the same, if all of those IP addresses fall within a predetermined range. The recipient may specify the range as, for example, 0.0.0.1 to 0.0.0.8 inclusive. Any connection made from one of these IP addresses would be determined to be from the same sender in this instance. Additionally, a sender may be identified by a sender domain name or a sender mail from address obtained using the SMTP protocol. For example, the sender may send e-mail from the domain name "email.domain" or from an e-mail address "sender@email.domain." Either of these, or any other identifier, can be substituted in place of IP addresses as they are used in this description.

"Control" refers to a state where an IP address linked to a specific sender is logged and brought to the attention of an administrator of the recipient. Placing an IP address, or range of IP addresses under control logs the IP address and performs an action designated by the administrator. For example, the administrator may choose to do nothing (monitor), to accept all connections, to reject all connections, or to accept some connections from a sender.

In block 206, it is determined whether the number of concurrent connections is greater than the predetermined threshold. The threshold can be specified by the recipient, and may vary depending on the specifics of the recipients system. For example, where a recipient system has a large amount of bandwidth or a large number of available connections, the recipient may establish a high threshold. A low threshold may be used where each connection is capable of transferring a large number e-mails, or where a recipient has determined that their system is often targeted for abuse.

If it is determined that the number of concurrent connection exceeds the specified threshold, the process continues to block 208 where a control operation is performed. The control operation places the sender under control, which may result in the performance of a number of different operations. For example, the recipient may choose to do nothing, and merely monitor the offending connections. The recipient can then determine what action should be taken in the future regarding this specific sender. For example, after monitoring a specific sender from a specific IP address, the administrator of the recipient system may determine that the sender is an abusive sender, and that the sender's e-mails should be rejected. In this case, the administrator will instruct the recipient system to reject all connections from that specific sender. This may be useful for blocking incoming UBE, since the administrator can determine, based upon the identity of the sender, whether messages sent from those IP's should be blocked. On the other hand, a bulk e-mailer, such as a retailer or provider of other legitimate services may send a large quantity of e-mails to a recipient, such as a periodic newsletter listing their current specials. The individual users who receive these e-mails may want to receive these e-mails, and even though the sender is occupying a large number of connections and transmitting a large amount of e-mail traffic, the administrator may want to allow this sender to make all of their connections since the end user may be upset if these e-mails are blocked. In this case, the administrator can instruct the recipient system to allow all connections from that specific sender.

Alternatively, an administrator can instruct a system to accept only a specific number of connections at one time. For example, the administrator can instruct the recipient system to accept only a number of connections up to threshold number, and to reject all connections that exceed that number. This may be useful where the administrator wants to allow a specific sender to send e-mails to the recipient system, but the sender often sends large amounts of e-mail at once. This would allow the sender to continue sending messages at a later time, without overwhelming the system by making multiple concurrent connections.

The operations described in the process 200 may be executed in an extension server such as the extension server 116. Using the extension server 116 removes the burden from the MTA 110. The extension server 116 may be a physically separate server, and can perform operations for the MTA 110, as described above. It is understood that, where it is appropriate, the process may also be performed by the MTA 110.

FIGS. 3A-3D illustrate exemplary control panels for a recipient system employing an embodiment of the current invention. These control panels may be typical system displays that can be viewed and manipulated by a system administrator. The control panels may show those senders that have been placed under control, as well as other configurable settings.

FIG. 3A illustrates a control panel displaying the threshold value and the amount of time monitored, both of which are adjustable by an administrator. The control panel 300 includes two fields 302 and 304. The field 302 lists the threshold number. Here, once a single sender has made three or more connections, the sender will come under control. The column 304 lists the amount of time monitored. Here, the sender must make three or more connections within ten minutes to trigger the control. The recipient will continuously monitor the number of connections made within the last ten minutes or within the amount of time specified in the column 306.

FIG. 3B illustrates a control panel listing those connections that have been brought under control. The control panel 310 includes three columns, 312, 314, and 316. The column 312 lists the IP address or the range of IP addresses, the column 314 lists the number of concurrent connections, or the number of connections made within an amount of time specified in the column 304, and the column 316 lists the action to be taken when the threshold number of connections is exceeded within the specified amount of time. As shown here, the recipient system is currently monitoring all incoming connections so that an administrator may determine what actions are appropriate. As a result, the recipient does nothing abnormal when a connection request is made, and accepts all incoming requests from these senders. The do nothing command may indicate that no action has been taken yet with regard to a specific sender. With this information, the administrator can determine whether or not a specific sender is harmful, and can determine what action is appropriate.

An administrator can assign the do nothing command to all senders when first starting the process 200. This designation effectively monitors all incoming e-mail connections. The administrator can then use the information gleaned from monitoring incoming connections to determine the appropriate action for specific senders.

FIG. 3C illustrates a control panel that lists senders for which the administrator has determined an appropriate action. As can be seen, the IP address 0.0.0.1 will be rejected after more than three concurrent connections are made. The administrator may have determined that the sender at the IP address 0.0.0.1 is not harmful, and should be permitted to continue sending e-mails to the recipient. However, the administrator may be mindful of the fact that the sender of the IP address 0.0.0.1 is sending large quantities of e-mail, thereby burdening the recipient's system. As a result, the administrator has decided to reject more than three concurrent connections.

Connections from the sender at the IP address 0.0.0.3 will always be accepted regardless of the number of concurrent connections. The administrator may have determined that the sender located at this IP address is an important sender that sends large quantities of e-mails. For example, the sender at this e-mail address may be a national e-mail provider that often delivers large quantities of mail to the recipient system. In this case, the administrator would not want to prevent these e-mails from reaching their intended recipients.

Connections from the sender at the IP address 0.0.0.8 will be rejected if there has been one or more connections made within the last ten minutes. As can be seen here, the recipient may reject a connection when the sender exceeds any number of connections that the recipient determines, not just the predetermined threshold value.

The sender at the IP addresses 0.0.0.12-0.0.0.14 will always have their connections rejected. The administrator may have determined that the sender at the IP addresses 0.0.0.12-0.0.0.14 is an abusive or otherwise harmful sender, and the recipient wants to prevent these e-mails from reaching their system.

FIG. 3D illustrates a table showing actions to take for a specific IP addresses. Once the administrator of the recipient system has classified a specific sender, the recipient system can build a table showing which action should be taken when encountering a specific sender. The process 200 can reference the table 350 at to determine the appropriate action for a specific sender. The table 350 lists IP addresses in the column 352 and actions in the column 354. All of the IP address 0.0.0.1 through 0.0.0.14 may have accessed the recipient system at some time, however, only the senders at 0.0.0.1, 0.0.0.3, 0.0.0.8, and 0.0.0.12 through 0.0.0.14 have triggered the control by trying to initiate more than threshold number of connections. Since the other senders have not triggered the control, they recipient will "do nothing" when access is requested. If any of these senders exceeds the threshold number of connections in the future, the senders will be put under control, and the system administrator can determine what action to take at that time. Until then, connections by those senders may be allowed. However, it is contemplated that a system administrator may specifically determine an action for a sender that is not triggered control if the system administrator knows that a specific sender should have a specific action assigned to them. For example, if the system administrator knows that the sender at the IP 0.0.0.6 sends abusive e-mails, even though the control has not been triggered, the system administrator may still place the IP 0.0.0.6 under a reject command when a connection is made.

FIGS. 4-8 illustrate a second embodiment of the invention. According to the second embodiment of the invention, an e-mail system can reject e-mail connections from specific senders based on an Internet Protocol (IP) address of the sender and a time of the transmission. Agreements can be formed between e-mail senders and e-mail recipients to allow e-mail senders to transmit bulk messages during specified periods. These agreements can be implemented by a mail transfer agent (MTA) on the e-mail recipient system. The agreements may be structured so that several different bulk e-mailers may be allowed to transmit bulk e-mail to a recipient at different times of the day. In this way, an e-mail recipient can structure e-mail traffic onto their system so that they can achieve a more sustainable flow of incoming e-mail and avoid upgrading the capacity of their system. For example, a recipient's system may have to be upgraded to handle the volume of e-mail at peak times, while at off-peak times there is a much smaller demand since the recipient system is receiving many fewer messages. The recipient can construct agreements with bulk e-mailers so that the bulk e-mail will be sent at off-peak times, and individual bulk e-mailers may have their access times spread out so that the load on the recipient system is evened out.

FIGS. 4A and 4B illustrate incoming network traffic to a typical recipient e-mail server. The graph 400 includes an x-axis showing the time of day, a y-axis 404 showing the amount of traffic, and a line graph 406 showing the amount of traffic at a particular time of day. The network traffic shown in the graph 406 is uneven. The recipient has much higher traffic volumes between the hours of 8 a.m. and 8 p.m. These peaks may require server upgrades to handle only the peak traffic, while traffic at non-peak times underutilizes the server. The graph 450 may be network traffic on a recipient that utilizes an embodiment of the invention. The peak traffic shown in the graph 450 is much lower than that shown in the graph 400, while still handling approximately the same overall amount of traffic. This can be achieved by redirecting the incoming e-mail traffic away from peak times and toward non-peak times.

FIG. 5 illustrates a list of potential senders to a recipient 500. The list 500 includes several columns including an allowed list 502, a denied list 504, and a conditional allowed list 506. The allowed list 502 lists those senders that the recipient will always trust. For example, a recipient that has built this list will always trust e-mails sent from a sender at an IP address of 0.0.0.1 or 0.0.0.2. The connections from these senders will always be accepted, regardless of when they are sent or the size or quantity of the messages. The senders on the allowed list 502 may be senders that are personally known to the recipient and that the recipient knows they can always trust.

A denied list 504 includes a list of e-mail senders the recipient will never trust. In other words, the recipient will always reject a connection from an IP address listed in the denied list 504. Here, if a sender from the IP address 0.0.0.3 or 0.0.0.4 attempts to make an e-mail connection with the recipient, the recipient will always reject the connection. The recipient may establish a denied list 504 in order to prevent large quantities of unwanted bulk e-mail from senders that the recipient knows to be abusers of the recipient system. For example, senders that transmit large quantities of UBE or otherwise unwanted bulk e-mail may be placed on the denied list 504 to reduce unnecessary network traffic and protect the end users who would receive the e-mail messages.

The column 506 establishes a conditional allowed list. The conditional allowed list 506 is a list of e-mail senders that may transmit e-mail messages to the recipient under certain conditions. As will be discussed, the e-mail senders corresponding to the e-mail addresses listed in the conditional allowed list 306 can transmit e-mail messages to the recipient on certain days or at times, or both. It is understood that other conditions such as how much traffic an IP address has recently sent, how many concurrent connections the sender's IP address has made from the conditions, the size or quantity of messages being sent, etc. may also be used as conditions to limit the amount of traffic from specific IP addresses. As shown here, the recipient may or may not accept a connection with a sender from an IP address in the range between 0.0.0.5 and 0.0.0.15. Conditions can be established under which these IP addresses may transmit e-mail messages to the recipient. These conditions will be explained below.

Although single IP addresses are discussed above when classifying the senders, it is understood that a range of IP addresses may also be used to list the senders. For example, the allowed list 502 may include an entry that reads 0.0.2.1-0.0.2.4. Large senders often will occupy a range of IP addresses, each one for a different server. In this case, any e-mail sent from a server in the range 0.0.2.1-0.0.2.4 (i.e., 0.0.2.1, 0.0.2.2, 0.0.2.3, and 0.0.2.4) will always be accepted.

Conditions for accepting an incoming e-mail connection can result from an agreement between a sender and the recipient. For example, a recipient may require that a sender only be able to transmit e-mail messages at a specific time of day. The sender understands these conditions, and will only attempt to send e-mail messages during these agreed upon times. As a result, the recipient is able to better predict the amount of incoming e-mail traffic at any given time.

FIG. 6 illustrates a table establishing conditions for the e-mail connections of specific IP addresses. The column 602 lists specific IP addresses, the column 604 lists the day of the week during which a connection with that IP address is allowed, the column 606 lists the time of day during which the connection is allowed, and the column 608 lists the rate limit.

It is understood that even though the column 604 shows days of the week, that other date formats may be used. For example, days of the month may also be used, such that the first day of the month would be designated with a '1', the second day of the month would be designated with a '2', etc. It is also understood that the column 604 can also be listed by days of the year or any other appropriate system.

The rows 610 through 616 list the conditions for accepting a connection from a sender at an IP of 0.0.0.5 through 0.0.0.8. For example, the cell found at the row 610 and the column 604 lists the days of the week during which a sender at the IP address 0.0.0.5 may connect to the recipient. As can be seen, the sender at 0.0.0.5 may connect with the recipient during any day of the week. However, during the weekdays (i.e., Monday through Friday), the IP address 0.0.0.5 is allowed to transmit only between 1:00 a.m. and 2:00 a.m. On Saturday and Sunday the IP address 0.0.0.5 may transmit at any time. The column 608 also shows a rate limit for the IP address 0.0.0.5. On the weekdays, the IP address 0.0.0.5 may transmit only 5 messages per second (msg/s). Any additional messages will be rejected. It is understood that the rate limit may also be stated in terms of size, for example, an IP address may transmit only 5 kilobytes per second (KB/s). It is further understood that any appropriate method of rate limiting may also be used here.

As can be seen in FIG. 6, the IP address 0.0.0.5 is not allowed to transmit messages to the recipient during daytime hours on weekdays. The times chosen during which the sender is allowed to transmit e-mail messages the recipient may be those during which the recipient typically has a low volume of e-mail network traffic. For example, during the hours between 1:00 a.m. and 2:00 a.m., an e-mail system may typically not be handling much e-mail traffic because users tend to be asleep at those hours.

The IP address 0.0.0.5 may also send high volumes of e-mail to the recipient. Therefore, it may be necessary to provide several times during which the sender of the IP address 0.0.0.5 can transmit e-mail messages to the recipient. For example, the sender at the IP address 0.0.0.5 may transmit a daily newsletter to several users on the recipient. The recipient may establish the agreement with the sender such that the operator of that system will only transmit e-mail during the times specified in the table 600. As mentioned above, these times may be established by determining times of low network traffic times or configuring schedules such that e-mail traffic is evened out (see e.g., FIGS. 4A-B). If the recipient knows that a specific sender will only be transmitting during these specific times, the recipient can better plan for the expected volume of e-mail during those times. For example, if most of the recipient's e-mail traffic arrives at or near the same, an e-mail system may have to be upgraded just to handle the peak rate of traffic during those times. However, if a large portion of the e-mails received at the peak times are e-mails that could be sent at other nonpeak times, by establishing an agreement with the sender, and thereby scheduling those bulk e-mails during those nonpeak times, the recipient system can avoid expensive upgrades. Scheduling e-mail delivery also allows the recipient system to plan other network activities such as scheduled maintenance and arrange agreements such that e-mail traffic during maintenance will be reduced.

The row 612 shows the schedule delivery periods for the IP address 0.0.0.6. As can be seen, the IP address 0.0.0.6 may only transmit e-mails to the recipient between 3:00 a.m. and 4:00 a.m. on Thursdays. If the sender at the IP address 0.0.0.6 only sends a small volume of e-mail to the recipient, the recipient can schedule this small window of time to allow the IP address 0.0.0.6 to transmit messages. The row 614 shows the limits for the IP address 0.0.0.7, which may send messages to the recipient on Saturdays and Sundays only. The IP address 0.0.0.7 is also subject to a rate limit of five messages per second. The row 616 shows the conditions for the IP address 0.0.0.8, which is only subject to a transmission limit of five messages per second.

As is understood, the system described herein does not distinguish between e-mails based on content. Thus, system resources that would otherwise be used to scan incoming e-mails are saved. Once the agreements are established, an administrator for the recipient system can easily determine whether an incoming e-mail transfer request conforms to the established conditions. These checks require small system overhead when compared to the large amount required for content checking. A recipient may still block UBE messages. If those messages are sent from known IPs, the recipient may place the sender's IP address on the denied list 604 as described earlier. It is also possible, in one embodiment, to use the processes described herein in conjunction with a traditional content filter.

Figure 7:
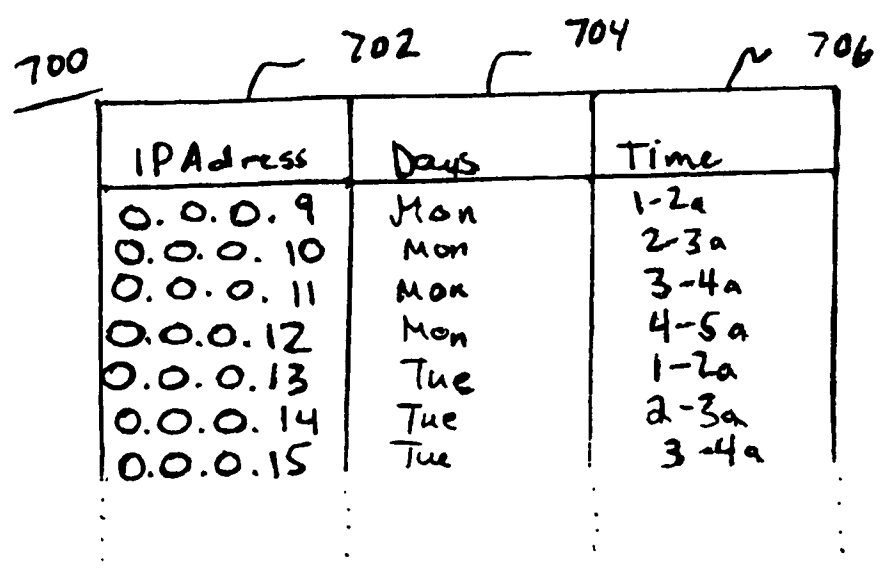

FIG. 7 illustrates a table that includes a schedule listing when senders from specific IP addresses may transmit e-mail. It is possible to schedule several different IPs to transmit e-mails during several different times. This scheduling can help to even out network traffic, as well as make the amount of traffic more predictable. The table 700 includes several columns 702, 704, and 706. The column 702 lists the IP address of the sender, the column 704 lists the day of the week on which the sender may transmit e-mail messages to the recipient, and the column 706 lists the time of day during which the messages may be transmitted. As can be seen, all of the IP addresses 0.0.0.9-0.0.0.15 as listed in the column 702 are assigned different times during which they may transmit e-mail to the recipient. These times are shown during early hours of the morning at which time there may be slow network traffic. The recipient can assign a different time slot to each of the senders so that peaks of e-mail traffic are reduced and the system receives a more even flow of e-mail. In one embodiment, lager e-mail senders may be assigned a larger window of time. Also, other conditions may be added to the table such as rate limiting (shown above), and other factors such as total number of network connections, size of messages, etc.

Figure 8:
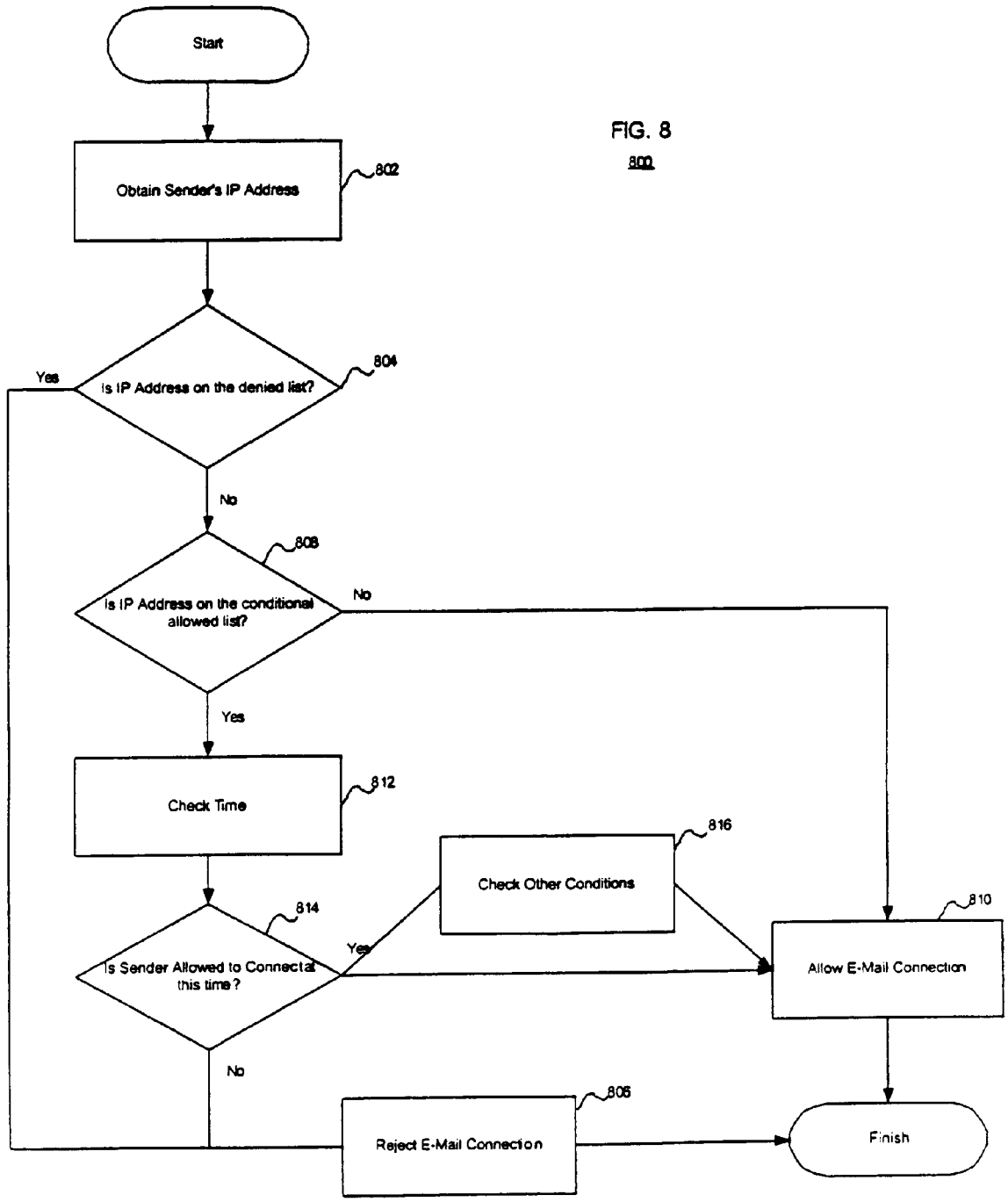
FIG. 8 is a flow chart illustrating the embodiment of the invention.

FIG. 8 is a flow chart illustrating the embodiment of the invention. In block 802, a sender's IP address is obtained. The IP address may be obtained from the sender's transmission using any well-known method. In block 804, it is determined whether the sender's IP address is on the denied list 604. If the IP address is on the denied list, the process moves onto block 806 where the e-mail connection is rejected and the process is finished. If the IP address is not on the denied list, then the process moves on to block 808. In block 808, it is determined whether the IP address is on the conditional allowed list 606. If the IP address is not on the conditional allowed list, then the process moves on to block 810 where the e-mail connection is allowed and the process finishes. Here, if the sender's IP address is not on the denied list 604 and not on the conditional allowed list 606 it is assumed that the sender's IP address is on the allowed list 602, and that all e-mail traffic from the sender should be accepted.

If the sender's IP address is on the conditional allowed list, in block 810, the system checks the day and time of the transmission. In block 812, the recipient system compares the current day and time with the terms set out in the conditional allowed list, such as those tables found in tables 600 and 700, and determines whether the sender is allowed to connect at this time. If the sender is allowed to connect, the process continues to block 810 where the e-mail connection is allowed and the process finishes. If it determined that the sender is not allowed to connect at this time, the process continues to block 806 where the e-mail connection is rejected and the process finishes.

It is understood that the flowchart in FIG. 8 illustrates an embodiment of the invention which introduces a condition placed on e-mail traffic such that certain senders e-mail may transmit during certain times. However, as is described above, other conditions may be added and checked later. For example, after block 812, if it is determined that the sender is allowed to connect at that time, in block 816, other conditions may be checked such as rate limits, etc. before the process moves onto block 710 allows the e-mail connection. Alternatively, the other conditions may be checked anywhere during the process 800.

Figure 10:
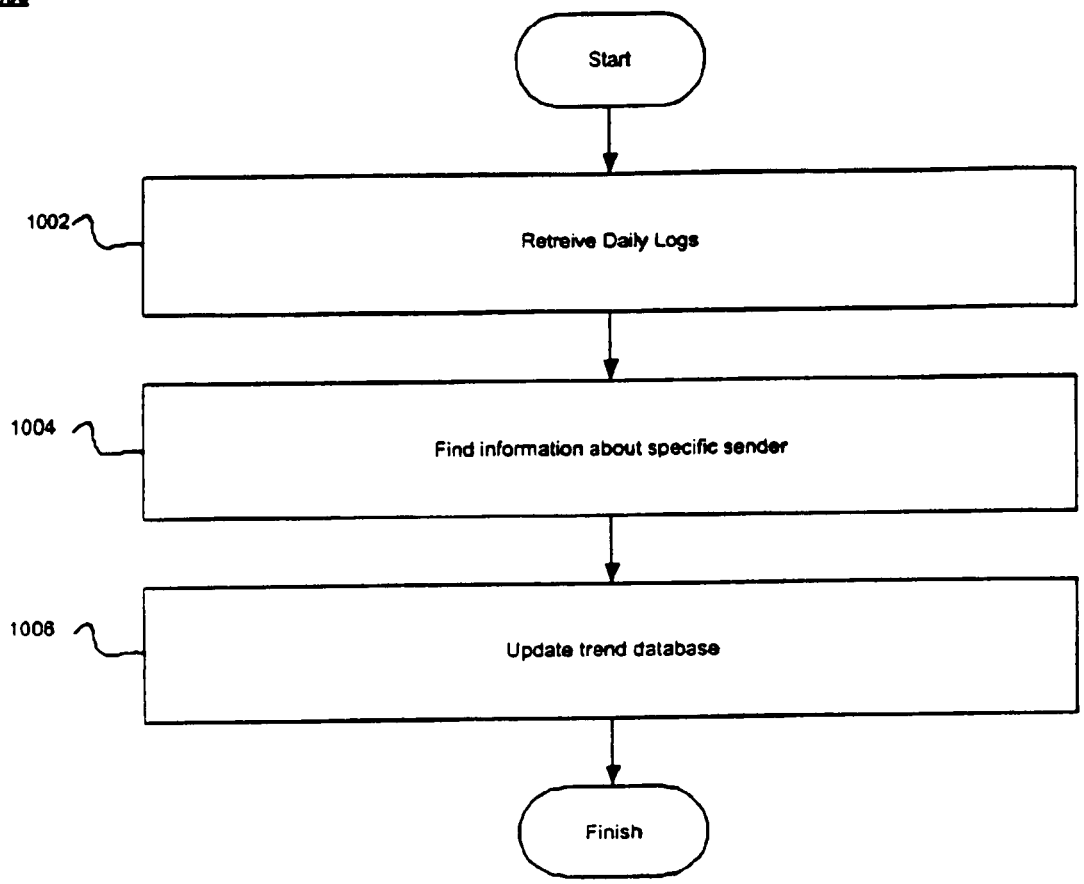
FIG. 10 is a flowchart describing a process for establishing trend data.
Figure 11:
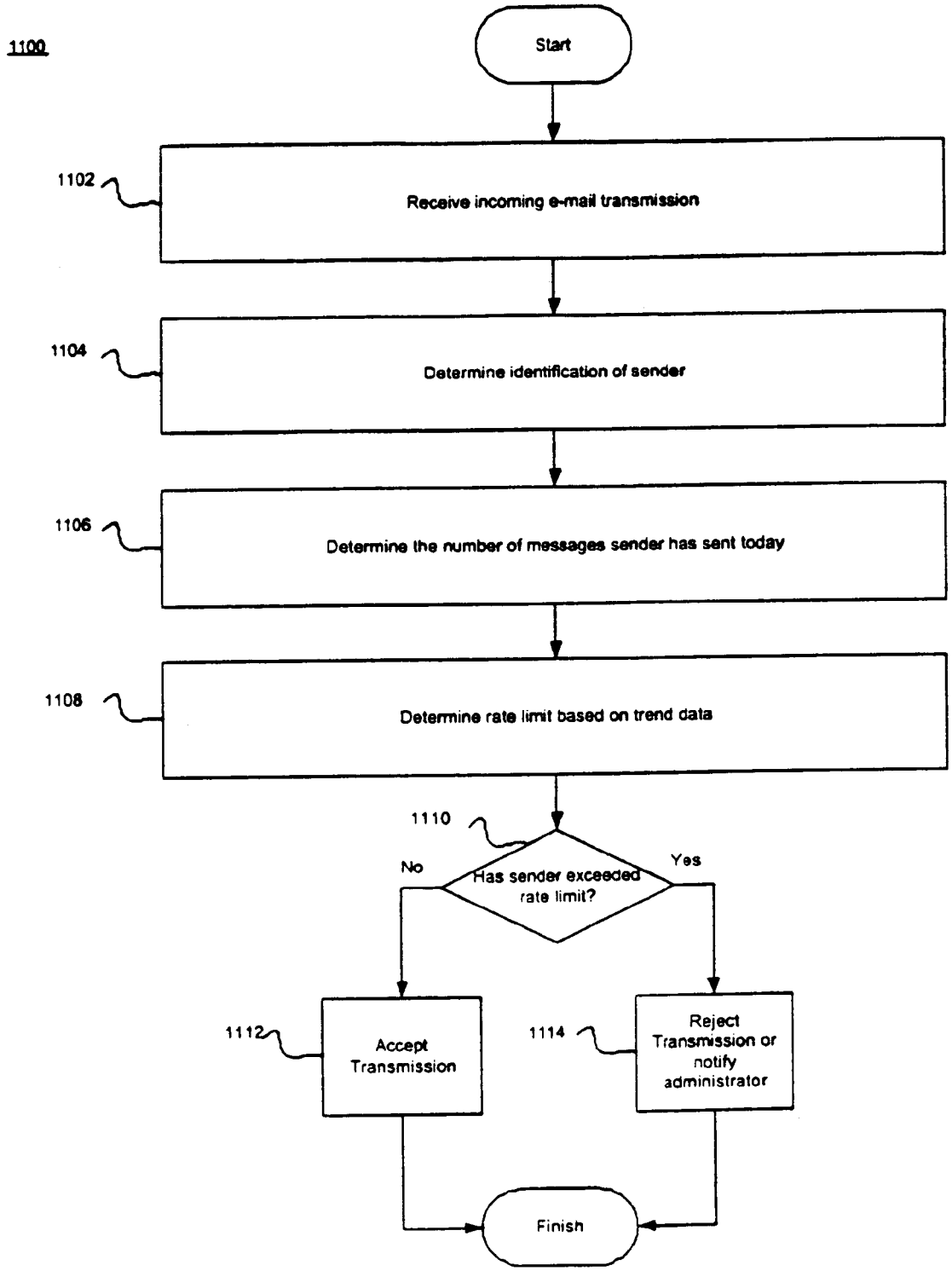
FIG. 11 is a flowchart describing a process for applying rate limiting using trend data.

FIGS. 9-11 describe a third embodiment of the invention. According to the third embodiment of the invention, rate limits are based on historical trends. For example, a sender may be identified by an IP address, range of IP addresses, a mail-from address (the e-mail address from which the e-mail is being sent), etc. The recipient maintains a database including a historical trend showing e-mail activity by the sender over a recurring period of time, such as weekdays. For each weekday, the database shows an average of the sender's activity over the past few weeks.

For example, assume this sender typically sends the recipient 1000 e-mail messages on Mondays. This data is stored in a trend database. When the sender attempts to send e-mail to the recipient, the trend database is accessed, and the historical trend for the sender can be used to establish a rate limit for that sender. For example, on Mondays, a rate limit of 1000 e-mail messages may be set, based on the prior sending patterns of the sender. The trend database may be divided into periods of time. For example, the trend database may maintain historical trends for each day of the week. Assume that the sender sends more messages on Mondays than on Sundays. The limit would then be lower on Sunday than on Monday.

FIG. 9 illustrates a table containing historical trends for two senders. The table 900 includes two columns 902 and 904. The column 902 lists historical e-mail traffic trends for a sender located at the IP address 0.0.0.1, while the column 904 lists historical e-mail traffic trends for a sender located at the IP address 0.0.0.2. As can be seen, on Mondays, the sender at 0.0.0.1 typically sends 1005 email messages to the recipient, while the sender at 0.0.0.2 typically sends 23 email messages. This trend data can be used to establish rate limits on the number of messages that the sender can send.

A low-volume sender, such as the sender at the IP address 0.0.0.2, may have their system overtaken by a malicious bulk e-mail sender. A large increase in the number of messages sent by a sender may indicate that the sender's system has been overtaken and is being used for malicious purposes. On the other hand, a high-volume sender, such as the sender at the IP address 0.0.0.1, may be frequently sending many legitimate e-mail messages. The embodiment described herein allows these high-volume senders to continue to send large numbers of e-mails, while protecting against a malicious user overtaking a low-volume sender's system.

FIG. 10 is a flowchart describing a process for establishing trend data. The trend data in the table 900 is determined over a period of time. The process 1000 explains how this data is analyzed. In block 1002, daily logs of activity on the recipient servers are received. The daily logs include data about the e-mail that a recipient has received over one day. In block 1004, data about a specific sender is generated from the logs.

The data typically comprises the number of messages received from that sender during the period of time the logs are recorded.

In block 1006, the trend database is updated. The trend data for each sender is maintained for a predetermined period. For example, if the period was weekdays, and today is a Thursday, the trend database could determine a rolling average of the number of messages sent over the previous ten Thursdays. The trend database may also measure the average number of messages sent over all time. It is understood that other techniques for determining the trend data may be used. For example, the trend data may be weighted toward more recent data. When deriving the average, the number of messages sent yesterday may be given twice as much weight as the number of messages sent ten days ago. It is also understood that periods other than weekdays may be established. For example, trend data may be determined for every hour of the day.

FIG. 11 is a flowchart describing a process for applying rate limiting using trend data. In block 1102, the recipient receives an incoming e-mail transmission from a sender. In block 1104, the recipient determines the identity of the sender from the mail from address. In block 1106, the recipient determines the total number of messages already sent by the sender today. Alternatively, if the trend data looks at another period of time, the recipient determines the total number of messages sent by the sender during that period.

In block 1108, the recipient determines a rate limit based on the trend data. The rate limit may match the historical trend or may be a percentage of, or above the historical trend. For example, the rate limit may establish that a sender may send 20% more messages than they have historically. Therefore, if a sender typically sends 100 messages during this period, the rate limit would be 120 messages for the entire period.

In block 1110, it is determined whether the sender would exceed the limit with the messages the sender is attempting to send. If the sender would not exceed the limit, in block 1112, the transmission is accepted. If the transmission would exceed the limit, the recipient can either reject the transmission outright, or can accept the transmission and notify a system administrator that the limit has been exceeded.

According to another embodiment of the invention, the recipient may reward a sender for consistently reducing their e-mail traffic by allowing their e-mail to be sent more quickly. For example, the recipient may spend less time analyzing messages sent by a sender that is reducing the number of messages sent to the recipient. Likewise, the recipient can increase the amount of time required for a message to be delivered when a sender approaches their rate limit by increasing the amount of analysis each message is subject to.

Figure 12:
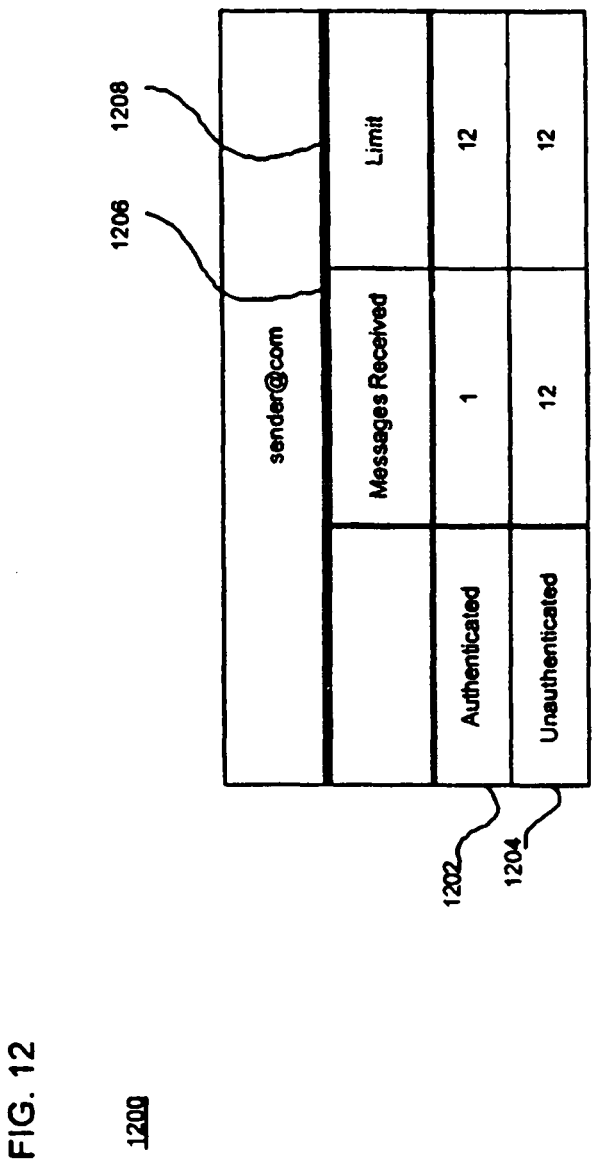
FIG. 12 illustrates a panel showing two rate limits for a sender.
Figure 13:
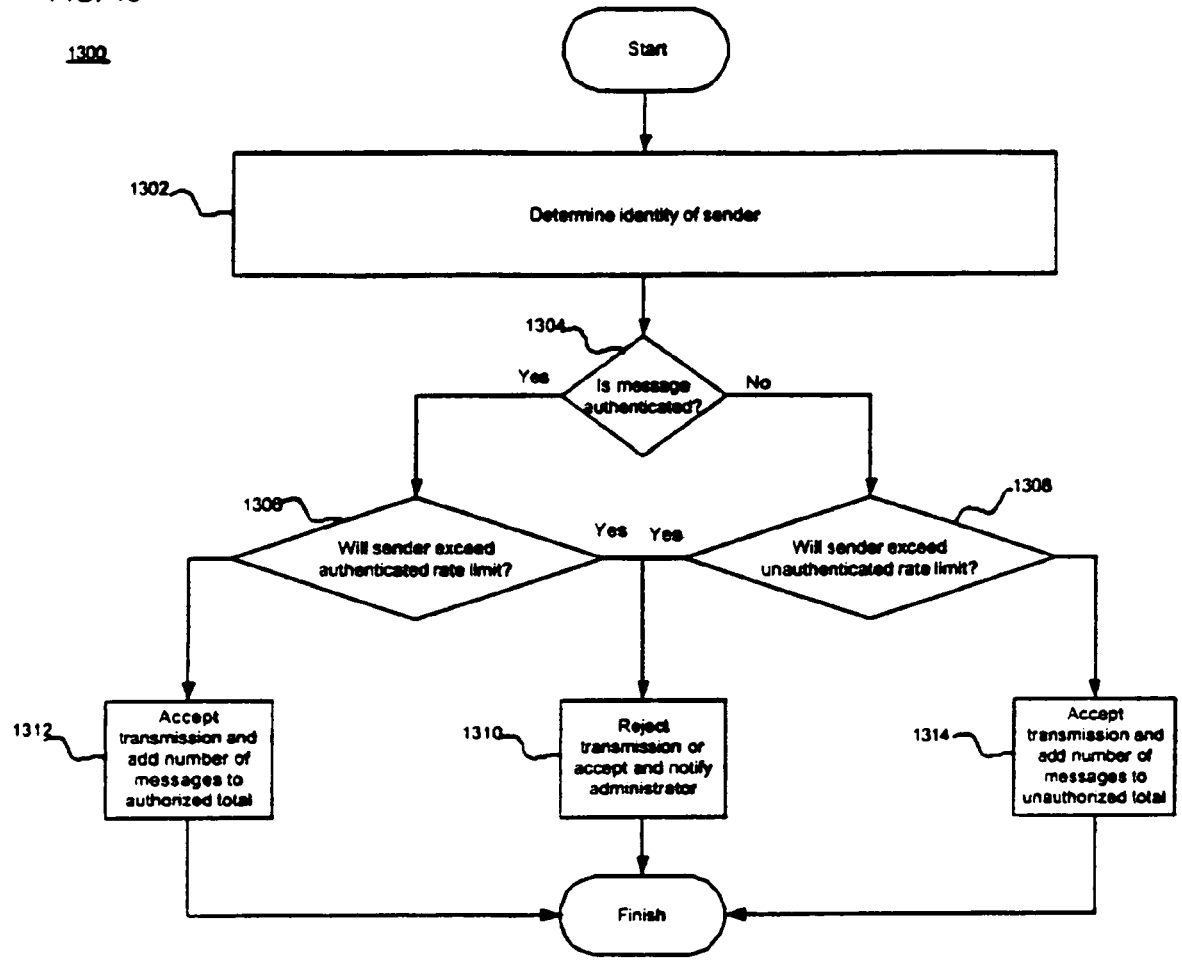
FIG. 13 is a flowchart describing a process for limiting unauthenticated messages according to a fourth embodiment of the invention.

FIGS. 12 and 13 describe a fourth embodiment of the invention. According to the fourth embodiment of the invention, two different rate limits are maintained for each sender. A sender from a mail-from address may send messages that are either authenticated or not authenticated. When an authenticated e-mail message is sent, the message counts against the user's authenticated rate limit. When an unauthenticated message is sent, it is counted against the user's unauthenticated limit.

A sender of UBE may "spoof" a mail-from address. For example, the sender may send e-mail messages using someone else's e-mail address as the mail-from address. If a normal rate limit is maintained by the recipient for the actual owner of the e-mail address, the sender of the UBE may cause the rate limit for that owner to be exceeded, preventing the legitimate owner from sending messages to the recipient. The SMTP protocol includes a feature that allows a genuine sender to authenticate the mail-from address. If a sender that is spoofing the mail-from address sends mail, the messages sent by the malicious sender are unauthenticated.

FIG. 12 illustrates a panel showing two rate limits for a sender. The panel 1200 shows the limits for the sender at the mail-from address "sender@com." The row 1202 lists the statistics for authenticated messages, and the row 1204 lists the statistics for unauthenticated messages. The column 1206 lists the number of messages already received during the rate limit period, and the column 1208 lists the rate limits. For example, the sender "sender@com" has already sent 12 unauthenticated messages, reaching the limit. The recipient will either not accept any more messages from the sender or will alert a system administrator when the sender attempts to send a message. The sender has only sent one authenticated message during the rate limit period, so the sender can send 11 more authenticated messages during the period of the rate limit.

FIG. 13 is a flowchart describing a process for limiting unauthenticated messages according to a fourth embodiment of the invention. In block 1302, the identity of the sender is determined. In block 1304, it is determined whether the message is authenticated according to the SMTP protocol. If the message is authenticated, the process 1300 continues to block 1306. If the message is not authenticated, the process 1300 continues to block 1308.

In block 1306, it is determined whether the sender will exceed the authenticated rate limit with the incoming message. If the rate limit will be exceeded, in block 1310, the incoming transmission is either rejected, or it is accepted and a system administrator is notified. If the rate limit is not exceeded, the transmission is accepted in block 1312, and the number of messages in the transmission is added to the "messages received" column 1206.

In block 1308, it is determined whether the sender will exceed the unauthenticated rate limit with the incoming message. If the rate limit will be exceeded, in block 1310, the incoming transmission is either rejected, or it is accepted and a system administrator is notified. If the rate limit is not exceeded, the transmission is accepted in block 1314, and the number of messages in the transmission is added to the "messages received" column 1206.

It is understood that although the rate limit here is discussed in terms of the number of messages sent, that rates may be based on other factors. For example, the rate may be based on the size of messages sent. It is further understood that the rate limit may be established using any of the techniques described herein.

Figure 14:
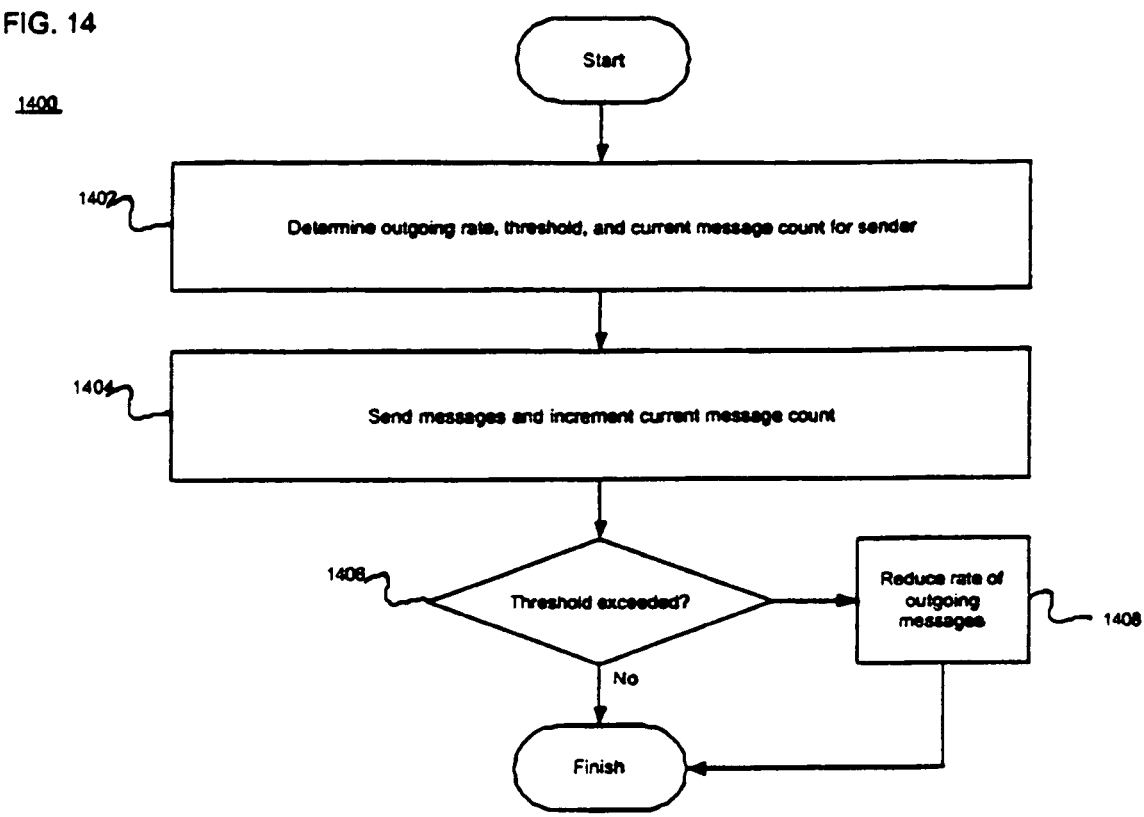
FIG. 14 is a flowchart describing a process for limiting a rate of e-mail messages sent from a user's account.

FIG. 14 describes a fifth embodiment of the invention. The fifth embodiment of the invention focuses on a sender's e-mail system. According to the fifth embodiment, a sender's MTA 108 can prevent a user from sending large numbers of e-mail messages. The MTA 108 can track the number of messages or amount of traffic a user has sent during a certain time period. If this amount exceeds an "outgoing rate limit," the MTA can reduce the rate with which the messages are sent. By doing this, the MTA can prevent an abusive sender from overwhelming the sender's system, while not affecting a normal user, who may only send a few e-mail messages every day. For example, the MTA may establish that after a first message is sent, the user can only send ten messages per hour. The MTA may then establish that after the tenth message is sent, the user can only send five messages per hour. This may continue until the sender can send very few messages, say one per day. If a user's mail from account has been overtaken by a bulk e-mailer, the outgoing rate limit can prevent the bulk e-mailer from using that account effectively, while allowing the user to send messages at a normal rate.

FIG. 14 is a flowchart describing a process 1400 for limiting a rate of e-mail messages sent from a user's account. In block 1402, the current outgoing rate, threshold, and the current message count for the sender are determined. The outgoing rate is the current rate at which outgoing messages will be sent. The threshold is the number of messages that can be sent within a period of time before the rate will be reduced. The current message count is the number of messages sent by the sender in a predetermined amount of time. For example, the MTA may track the total number of messages sent over the past day. It is understood that although the number of messages is described here, the count may also count the size of the messages sent, etc.

In block 1404, the messages are sent and the current message count is incremented by the number of messages sent. When the messages are sent, they are subject to the rate established earlier. In block 1406, it is determined whether the threshold has been exceeded by the outgoing transmission. If it has not, the process 1400 finishes. If the threshold has been exceeded, the rate is reduced by a predetermined amount. For example, the MTA may have allowed this user to send five messages every hour. If the user sent several messages that caused his current message count to exceed the threshold, the user's rate may be reduced to two messages every hour. The rate is reduced even if the rate has already been reduced before. A normal user would not be affected by the reduction in rate. However, a large volume sender, or a sender using a captured system to send bulk e-mail is prevented from sending a large number of messages.

Some of the several embodiments described above have used IP addresses to identify specific senders. Alternatively, a sender may be identified by their "mail-from" e-mail address. A malicious sender may be able to change their IP address to avoid the traffic management techniques described. However, the sender maintains the same mail-from address. The techniques may also use any other method of identifying senders.

This invention has been described with reference to specific exemplary embodiments thereof. It will, however, be evident to persons having the benefit of this disclosure that various modifications may be made to these embodiments without departing from the broader spirit and scope of the invention. Specification and drawings are accordingly, to be regarded in an illustrative rather than in a restrictive sense.

The invention claimed is:

1. A computer implemented method for managing network traffic comprising:
   receiving an incoming transmission at a recipient mail transfer agent (MTA) at a specific time;
   determining an address belonging to a sender of the incoming transmission;
   determining a date or time of day during which the sender is allowed to establish a connection to the recipient MTA using the address;
   rejecting the connection if the date or time of day at which the incoming transmission is received does not lie within the date or time of day during which the sender is allowed to establish a connection;
   determining a rate limit for transmissions sent from the sender based on a number of transmissions previously sent by the sender over a recurring period of time, the time of the incoming transmission lying within the time period, by:
      maintaining a trend database including a historical trend of transmission activity by the sender over the recurring period of time; and
      using the historical trend to establish the rate limit;
   rejecting the connection if the rate limit has been exceeded by the sender; and
   accepting the connection if the date or time of day at which the incoming transmission is received lies within the date or time of day during which the sender is allowed to establish a connection and the rate limit has not been exceeded by the sender;
   further comprising:
   determining the historical trend by averaging transmission activity of the sender during the recurring period of time over a predetermined number of recurring periods.

2. The computer implemented method of claim 1, wherein the incoming transmission relates to an e-mail transmission sent using the simple mail transfer protocol (SMTP) and wherein the connection is a Transmission Control Protocol (TCP) connection.

3. The computer implemented method of claim 1, wherein the incoming transmission is allowed only on a specified date or on specified dates and only at a specified time or specified times of day.

4. The computer implemented method of claim 1, further comprising:
   maintaining a conditional allowed list that specifies a date or time of day at which the sender can send the incoming transmission to the recipient MTA; and
   wherein determining a date or time of day during which the sender is allowed to establish a connection to the recipient MTA comprises comparing the date or time of day at which the incoming transmission is received with the conditional allowed list.

5. The computer implemented method of claim 4, wherein the incoming transmission is allowed only on a specified date or on specified dates and only at a specified time or times of day.

6. The computer implemented method of claim 1, wherein the averaging transmission activity comprises:
   averaging a number of messages sent by the sender.

7. The computer implemented method of claim 1, wherein the averaging transmission activity comprises:
   averaging an amount of data sent by the sender.

8. The computer implemented method of claim 1, further comprising:
   reaching an agreement with the sender to establish the date or time of day.

9. The computer implemented method of claim 1, wherein the address comprises an Internet Protocol (IP) address.

10. A computer implemented method for managing network traffic comprising:
   receiving an incoming transmission at a recipient mail transfer agent (MTA) at a specific time, wherein the incoming transmission relates to an e-mail transmission sent using the simple mail transfer protocol (SMTP);
   determining an address belonging to a sender of the incoming transmission;
   determining a date or time of day during which the sender is allowed to establish a Transmission Control Protocol (TCP) connection to the recipient MTA using the address;
   rejecting the TCP connection if the date or time of day at which the incoming transmission is received does not lie within the date or time of day during which the sender is allowed to establish a TCP connection;
   determining a rate limit for transmissions sent from the sender, wherein the rate limit is determined based on a number of transmissions previously sent by the sender over a recurring period of time, the time of the transmission lying within the time period, by:
  maintaining a trend database including a historical trend of transmission activity by the sender over the recurring period of time; and
  using the historical trend for the sender to establish the rate limit;
rejecting the TCP connection if the rate limit has been exceeded by the sender; and
accepting the TCP connection if the date or time of day at which the incoming transmission is received lies within the date or time of day during which the sender is allowed to establish a TCP connection and the rate limit has not been exceeded by the sender;
further comprising:
determining the historical trend by averaging transmission activity of the sender during the recurring period of time over a predetermined number of recurring periods.

11. The computer implemented method of claim 10, further comprising:
maintaining a conditional allowed list that specifies a date or time of day at which the sender can establish a connection; and
wherein determining a date or time of day during which the sender is allowed to establish the TCP connection to the recipient using the address comprises comparing the date or time of day at which the incoming transmission is received with the conditional allowed list.

12. A system for managing network traffic comprising:
a server having a mail transfer agent (MTA) and non-transitory storage, wherein the non-transitory storage comprises instructions that, when executed by the MTA, configure the MTA to:
receive an incoming transmission at a specific time;
determine an address belonging to a sender of the incoming transmission;
determine a date or time of day during which the sender is allowed to send the incoming transmission to the server using the address;
reject the incoming transmission if the date or time of day at which the incoming transmission is received does not lie within the date or time of day during which the sender is allowed to send the incoming transmission;
determine a rate limit for transmissions sent from the sender, wherein the rate limit is determined based on a number of transmissions previously sent by the sender over a recurring period of time, the time of the transmission lying within the time period, by:
  maintaining a trend database including a historical trend of transmission activity by the sender over the recurring period of time; and
  using the historical trend for the sender to establish the rate limit;
reject the incoming transmission if the rate limit has been exceeded by the sender; and
accept the incoming transmission if the date or time of day at which the incoming transmission is received lies within the date or time of day during which the sender is allowed to send the incoming transmission and the rate limit has not been exceeded by the sender;
further comprising:
determining the historical trend by averaging transmission activity of the sender during the recurring period of time over a predetermined number of recurring periods.

13. The system of claim 12, wherein the server is further configured to:
maintain a conditional allowed list that specifies a date or time of day at which the sender can send the incoming transmission to the server; and
wherein determining a date or time of day during which the sender is allowed to send the transmission to the server comprises comparing the date or time of day at which the incoming transmission is received with the conditional allowed list.

14. The system of claim 12, wherein the averaging transmission activity comprises:
averaging a number of messages sent by the sender.

15. The system of claim 12, wherein the averaging transmission activity comprises:
averaging an amount of data sent by the sender.

16. A system for managing network traffic comprising:
a server having a mail transfer agent (MTA) and non-transitory storage, wherein the non-transitory storage comprises instructions that, when executed by the MTA, configure the MTA to:
receive an incoming transmission at a specific time, wherein the incoming transmission relates to an e-mail transmission sent using the simple mail transfer protocol (SMTP);
determine an address belonging to a sender of the incoming transmission;
determine a date or time of day during which the sender is allowed to establish a Transmission Control Protocol (TCP) connection to the server using the address;
reject the TCP connection if the date or time of day at which the incoming transmission is received does not lie within the date or time of day during which the sender is allowed to establish a TCP connection;
determine a rate limit for transmissions sent from the sender, wherein the rate limit is determined based on a number of transmissions previously sent by the sender over a recurring period of time, the time of the incoming transmission lying within the time period, by:
  maintaining a trend database including a historical trend of transmission activity by the sender over the recurring period of time; and
  using the historical trend for the sender to establish the rate limit;
reject the TCP connection if the rate limit has been exceeded by the sender; and
accept the TCP connection if the date or time of day at which the incoming transmission is received lies within the date or time of day during which the sender is allowed to establish a TCP connection and the rate limit has not been exceeded by the sender;
further comprising:
determining the historical trend by averaging transmission activity of the sender during the recurring period of time over a predetermined number of recurring periods.

17. The system of claim 16, wherein the server is further configured to:
maintain a conditional allowed list that specifies a date or time of day at which the sender can establish a TCP connection to the server; and
wherein determining a date or time of day during which the sender is allowed to establish a TCP connection to the server comprises comparing the date or time of day at which the incoming transmission is received with the conditional allowed list.

* * * * *